United States Patent Office
3,660,526
Patented May 2, 1972

3,660,526
ADHESIVE COMPOSITION CONTAINING A VINYL ESTER RESIN AND AN ACRYLIC ESTER OF TETRAHYDROFURFURYL ALCOHOL OR DIHYDRODICYCLOPENTADIENOL
Bernd Wegemund, Hilden-Rhineland, and Gunter Tauber, Dusseldorf-Holthausen, Germany, assignors to Henkel & Cie GmbH, Dusseldorf-Holthausen, Germany
No Drawing. Filed Mar. 30, 1970, Ser. No. 23,957
Claims priority, application Germany, Apr. 24, 1969, P 19 20 830.1
Int. Cl. C08g 45/04
U.S. Cl. 260—837 R
3 Claims

ABSTRACT OF THE DISCLOSURE

Adhesive compositions hardenable under exclusion of oxygen comprising liquid esters of methacrylic and acrylic acids which harden under exclusion of oxygen, an organic percompound selected from the group consisting of organic hydroperoxides having from 3 to 18 carbon atoms and organic peroxides whose half life decomposition temperature after 10 hours is greater than 85° C., and at least 10% by weight of an epoxide-group-free reaction product from a glycidyl ether of a polyhydric phenol and an acid of the formula

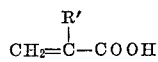

wherein R' is a member selected from the group consisting of hydrogen, lower alkyl and halogen, said reaction product having a molecular weight of between about 300 and 2500. Said compositions form a high tensile shear strength adhesive bond.

THE PRIOR ART

It is known that esters from methacrylic or acrylic acids with a large variety of alcohols together with organic hydroperoxides give mixtures which are able to harden on the exclusion of oxygen and which may be used as adhesives or sealing compositions. When esters of methacrylic and acrylic acids with cycloaliphatic alcohols are used, remarkable values for the tensile shear strength are obtained such as are important, for example, in the mounting of shafts. On the other hand, however, the values for the tensile shear strength are sometimes not quite what one could wish for.

OBJECTS OF THE INVENTION

An object of the present invention is the development of adhesives which harden on the exclusion of oxygen which may give adhesive bonds with high values for the tensile shear strength (DIN 53,283) such as are generally obtained only by two-component adhesives.

Another object of the present invention is the obtaining of adhesive compositions hardenable under exclusion of oxygen comprising liquid esters of methacrylic and acrylic acids which harden under exclusion of oxygen, an organic percompound selected from the group consisting of organic hydroperoxides having from 3 to 18 carbon atoms and organic peroxides whose half life decomposition temperature after 10 hours is greater than 85° C., and at least 10% by weight of an epoxide-group-free reaction product from a glycidyl ether of a polyhydric phenol and an acid of the formula

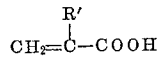

wherein R' is a member selected from the group consisting of hydrogen, lower alkyl and halogen, said reaction product having a molecular weight of between about 300 and 2500.

A further object of the present invention is, in the process of forming adhesive bonds between solid material comprising interposing a layer of liquid esters which harden under exclusion of oxygen of acids of the formula

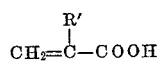

wherein R' is a member selected from the group consisting of hydrogen, lower alkyl and halogen, with alcohols, said esters containing from about 0.1% to about 20% of an organic percompound selected from the group consisting of organic hydroperoxides having from 3 to 18 carbon atoms and organic peroxides whose half life decomposition temperature after 10 hours is greater than 85° C., between said solid materials and excluding oxygen from said layer, the improvement which consists in adding to said liquid esters an epoxide-group-free reaction product from a glycidyl ether of a polyhydric phenol and an acid of the above formula, said reaction product having a molecular weight of between about 300 and 2500, in an amount sufficient to increase the tensile shear strength of the resultant adhesive bond.

These and other objects of the invention will become more apparent as the description thereof proceeds.

DESCRIPTION OF THE INVENTION

It has now been found that the tensile shear strength of adhesive bonds is improved when utilizing an adhesive or sealing composition which hardens on exclusion of oxygen comprising an optionally substituted acrylic acid ester and an organic peroxide and having a content of an epoxide-group-free reaction product prepared from a glycidyl ether of a polyhydric phenol and an acid of the formula

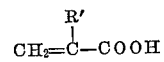

wherein R' is a member selected from the group consisting of hydrogen, lower alkyl, preferably methyl, and halogen, preferably chlorine.

Preferred compositions of the invention which harden on the exclusion of oxygen consist essentially of (a) From about 50% to 99.9%, preferably 75% to 95%, by weight, of a mixture consisting of (1) from 90% to 65% by weight of said mixture of liquid esters of acids of the formula

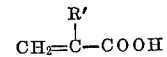

wherein R' is a member selected from the group consisting of hydrogen, lower alkyl and halogen, with alcohols having from 2 to 12 carbon atoms selected from the group consisting of cycloaliphatic alcohols, alkanediols, alkanenols, oxa-alkylene glycols and mixtures thereof and (2) from 10% to 35% by weight of said mixture of an epoxide-group-free reaction product from a glycidyl ether of a polyhydric phenol and an acid of the formula

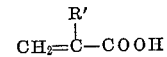

wherein R' has the above-assigned values, said reaction product having a molecular weight of between about 300 and 2500;

(b) From 0.1% to 20%, preferably from 0.5% to 10% by weight of a percompound selected from the group consisting of organic hydroperoxides having from 3 to 18 carbon atoms and organic peroxides whose half life decomposition temperature after 10 hours is greater than 85° C.; and (c) From 0 to 40% by weight of customary adhesive additives selected from the group consisting of unsaturated organic acids, unsaturated organic acid amides, unsaturated organic polyesters, thickeners, plasticizers, inorganic fillers, dyestuffs, stabilizers and accelerators.

The improvement of the bond strength is obtained especially with the esters of acrylic and methacrylic acids and cycloaliphatic alcohols possibly containing heteroatoms. Suitable alcohols include, for example, cycloalkanols having 4 to 7 carbon atoms, alkylcycloalkanols having 5 to 11 carbon atoms, cycloalkylalkanols having 5 to 11 carbon atoms and their mono- and dioxa derivatives, such as cyclohexanol, methylcyclohexanol, cyclopentanol, methylcyclopentanol, methylolcyclohexane, methylolcyclopentane, tetrahydrofurfuryl alcohol and 1,3-dioxa-2,2-dimethyl-4-methylolcyclopentane, as well as dimerized and polymerized cyclopentadiene alcohols such as dihydrodicyclopentadienol. Furthermore the hardenable mixtures may contain as their chief component possible substituted mono- or di-acrylic or methacrylic esters of polyhydric alcohols. These also include known esters which are able to harden with the exclusion of oxygen, of acrylic or methacrylic acid with, for example, alkanediols having 2 to 12 carbon atoms, polyoxyethylene glycols, thiodialkylene glycols having 4 to 8 carbon atoms, di-lower-alkanolamines and tri-lower-alkanolamines, such as ethylene glycol, diethylene glycol, triethylene glycol, thiodiethylene glycol, propylene glycol, diethanolamine or tripropanolamine. Mixtures of any of these liquid esters are also within the scope of the invention.

The mixtures according to the invention should furthermore contain the organic percompounds known to be suitable for this purpose. The use of organic hydroperoxides, which are derived from hydrocarbons which contain 3 to 18 carbon atoms, is advantageous. For example, tert.-butylhydroperoxide, cumenehydroperoxide, methylethylketone hydroperoxide, and diisopropylbenzene hydroperoxide are suitable. Also suitable are organic peroxides whose temperature at which the peroxides are half decomposed after 10 hours is greater than 85° to 90° C. These peroxides include, for example, tert.-butylperbenzoate, 2,2-bis-(tert.-butylperoxy)-butane, bis-(1 - hydroxycyclohexyl)-peroxide and tert.-butylperoxyisopropyl carbonate. The amount of peroxide should be between about 0.1% to 20%, especially 0.5 to 10% by weight, referred to the total weight of the mixture.

The epoxide-group free reaction products are prepared in known way by reacting an acid of the formula

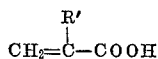

wherein R is a member selected from the group consisting of hydrogen, lower alkyl and halogen, and preferably acrylic or methacrylic acid with a usual glycidyl ether of a polyhydric phenol. The glycidyl ethers may be obtained, for example, by reaction of diphenylolpropane with epichlorhydrin. Acrylic or methacrylic acids may also be used with the glycidyl ethers in which other polyhydric phenols such as hydroquinone, resorcinol, diphenylolmethane or Novolak or the isomeric trihydroxybenzenes have been used as starting material. The preparation of the acrylic or methacrylic acid reaction products to be used according to the invention is described, for example, in the U.S. Pat. No. 3,372,221. For the preparation of these esters, one may start both from the pure compounds and from the so-called commercial epoxide resins. The glycidyl ether and acrylic or methacrylic acid are used in such proportions by weight that one carboxylic acid group is present to one epoxide group. The hydroxyl groups-containing esters of acrylic or methacrylic acid are thereby formed in a smooth reaction, especially when quaternary ammonium compounds are used as catalysts. The esterification reaction is carried out at temperatures from 80° to 150° C. and only needs a relatively short time, for example 1 hour at 120° C.

The hydroxyl groups-containing esters of acrylic or methacrylic acid to be used according to the invention should have a molecular weight of 300 to 2500. They are generally solid resinous to highly viscous products, which dissolve in the usual solvents such as benzene, toluene, acetone, butyl acetate, methylether of ethylene glycol, etc. Their content in the mixture should preferably lie between 10 and 35% by weight, referred to the content of the optionally substituted acrylic ester which hardens on exclusion of oxygen.

The adhesive mixtures according to the invention may contain in the usual way further additives which has a favourable action on the properties of the mixture or on the bonds produced therewith. Thus, in some cases it is expedient to add also small amounts of unsaturated acids, for example, lower alkenoic acids such as acrylic acid, methacrylic acid or itaconic acid or their amides such as acrylamide etc. The addition of unsaturated polyesters also frequently has a favourable effect on the properties of the bonds produced. These unsaturated compounds may be present in amounts of from 0 to 5%, preferably 0.1 to 2% by weight.

In some cases it is advantageous to add thickeners, plasticizers and inorganic fillers or dyestuffs to the mixtures of the invention. Suitable thickeners are polymeric compounds such as polymethylmethacrylate, polyethylacrylate, polystyrene, polyvinyl chloride, and copolymers of butadiene with acrylonitrile or styrene or copolymers of ethylene with vinyl acetate or acrylic esters and the like, which are soluble in the liquid acrylate esters. Examples of plasticizers which may be used are phthalates such as dioctyl phthalate or dibutyl phthalate, or esters of sebacic acid with alcohols such as butanol, octanol or decanol, or phosphoric acid esters such as tricresyl phosphate or sulphonic acid ester such as the ester of octadecylsulphonic acid and cresol or phenol. Suitable fillers are, for example, finely divided silicon dioxide, bentonites, calcium carbonate, titanium dioxide and the like. The thickeners and/or fillers as well as the plasticizers, acids and dyestuffs may be added in amounts of from 0 to about 40% by weight.

In many cases it is expedient to add stabilizers or accelerators to the mixtures of the invention. Suitable stabilizers are, for example, those employed as polymerization inhibitors for polymerizable monomers such as hydroquinone, quinone, 2,5-di-tert.-butylhydroquinone, N,N'-diphenylbenzidine, etc. The stabilizers, if added, are added in very small amounts in the order of from 0.001% to 0.1% of the mixture. Suitable accelerators are aliphatic or aromatic tertiary amines, for example tri-lower-alkylamines such as triethylamine, tributylamine, di-lower-alkylphenylamines such as dimethylaniline, p-dimethyltoluidine, sulphenamides such as N - diethyl - 2-benzo - thiazylsulphenamide or N - ethyl - N - cyclohexyl-benzothiazyl - sulpenamide, and sulphimides such as benzoic acid sulphimide. The accelerators are generally added only in small amounts of 0.1 to 5%. Of course, the mixtures of the invention can be free of added stabilizers or accelerators, therefore the mixtures of the invention can contain from 0 to 0.1% of stabilizers by weight and from 0 to 0.5% of accelerators by weight.

If the mixtures according to the invention are to be used for bonding or sealing glass, plastics or metals less active catalytically such as zinc, cadmium, high-alloy steels or anodized aluminum, it is advantageous to treat these materials prior to their utilization with metal salts of accelerating effectiveness, for example, copper or cobalt naphthenate, or with polyamines such as, for example, diethylenetriamine or mercaptans such as mercaptobenzthiazole, or with substances containing isocyanate groups such as triphenylmethane triisocyanate, or adducts of isocyanates to amines, sulphamides, or polyesters. This pretreatment may be carried out by dipping, brushing or spraying the parts with dilute solutions of the said compounds. On the other hand, it is not advisable to add such compounds to the mixtures of the invention at the beginning, since they greatly reduce the storability of the mixtures.

The mixtures according to the invention have an excellent stability against polymerization when exposed to the air in the presence of small amounts of oxygen. In comparison with the prior art mixtures, the bonds produced with these mixtures are distinguished by an improved tensile shear strength, which lies in the same order of magnitude as that of the usual cold hardened two-component adhesives based on epoxide resins.

In use, small amounts of the adhesive compositions of the invention hardenable on exclusion of oxygen are applied to the surfaces to be joined together. These surfaces are joined in such a way that air or oxygen is excluded from the joint. After a short period of time, of, for example, from ½ to 3 hours, an adhesive bond is obtained, which bond attains its ultimate strength after about 4 to 48 hours. If so desired, the hardening process can be accelerated by heating the junction.

The following specific embodiments are illustrative of the practice of the invention. It is to be understood, however, that they are not to be deemed limitative in any manner.

Example 1

A mixture was prepared from the following components:

42.0 gm. of the methacrylic acid ester of tetrahydrofurfuryl alcohol
26.3 gm. of the methacrylic acid ester of dihydrocyclopentadienol
20.0 gm. of the reaction product from the diglycidyl ether of diphenylolpropane with methacrylic acid in the molar proportion of 1:2 (molecular weight 510)
0.4 gm. of acrylamide
5.0 gm. of dibutyl phthalate
5.0 gm. of a 70% solution of cumene hydroperoxide in cumene
1.0 gm. of tributylamine
0.3 gm. of benzoic acid sulphimide Steel sheets of dimensions 100 x 25 x 1.25 mm., which were sanded at the bonding place with emery paper, were bonded with this mixture with about 10 mm. simply overlapped. After heating at 100° C. for 15 hours, a tensile shear strength of 2.2 kp./mm.² was measured (DIN 53,283).

Example 2

A mixture was prepared as described in Example 1. Here, however, 5 gm., of finely divided silicic acid were additionally added.

When steel sheets were bonded at 100° C., a tensile shear strength of 1.72 kp./mm.² was measured.

Bonds were also effected on steel and aluminum sheets at room temperature. The sheets were first sprayed on the bonding places with a 3% solution of mercaptobenzthiazole in methylene chloride. After 24 hours a tensile shear strength of 1.5 kp./mm.² mas measured on the steel sheets and 1.4 kp./mm.² on the aluminum sheets.

Example 3

A mixture was prepared according to Example 1, but instead of the dibutyl phthalate, dioctyl phthalate was used and 10.0 gm. of a copolymer from ethyl acrylate and ethylhexyl methacrylate was added.

Steel sheets were ground at the bonding places and, after an activation with a 3% solution of mercaptobenzthiazole in methylene chloride, were bonded with the above described mixture. After storing for 24 hours at room temperature, the tensile shear strength amounted to 1.6 kp./mm.².

Example 4

A mixture was prepared from the following components:

48.1 gm. of the methacrylic acid ester of tetrahydrofurfuryl alcohol
30.1 gm. of the methacrylic acid ester of dihydrodicyclopentadienol,
10.0 gm. of the reaction product from the diglycidyl ether of diphenylolpropane with methacrylic acid in the molar ratio of 1:2 (molecular weight 510)
5.0 gm. of a 70% solution of cumene hydroperoxide in cumene
1.0 gm. of triethylamine
0.3 gm. of benzoic acid sulphimide
0.4 gm. of acrylamide
3.0 gm. finely divided silicic acid.

As described in the foregoing examples, steel sheets were ground and after spraying with a 3% solution of mercaptobenzthiazole in methylene chloride, were bonded together. After storing for 3 days at room temperature, a shear strength of 1.4 kp./mm.² was measured.

Example 5

A mixture was prepared according to Example 1, but without acrylamide. Then steel sheets of dimensions 10 x 25 x 1.25 mm. were ground at the bonding place and sprayed with a 3% solution of mercaptobenzthiazole in methylene chloride. The sheets thus prepared were bonded with a simple overlap of 10 mm.

After a storage time of 7 days, an average tensile shear strength of 1.7 kp./mm.² was measured.

The preceding specific embodiments are illustrative of the practice of the invention. It is to be understood however, that other expedients known to those skilled in the art may be employed without departing from the spirit of the invention or the scope of the appended claims.

We claim:
1. An adhesive composition having excellent stability against polymerization when exposed to air and hardenable under exclusion of oxygen consisting essentially of
 (a) from about 50% to 99.9% by weight, of a mixture consisting of (1) from 90% to 65% by weight of said mixture of liquid esters of acids of the formula

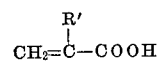

wherein R′ is a member selected from the group consisting of hydrogen, lower alkyl and halogen, with alcohols selected from the group consisting of tetrahydrofurfuryl alcohol, dihydrodicyclopentadienol, and mixtures thereof and (2) from 10% to 35% by weight of said mixture of an epoxide-group-free reaction product from a glycidyl ether of a polyhydric phenol and up to a 5% stoichiometric excess of an acid of the formula

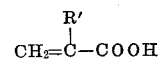

wherein R′ has the above-assigned values, said reaction product having a molecular weight of between about 300 and 2500;
 (b) from 0.1% to 20% by weight of a percompound selected from the group consisting of organic hydroperoxides having from 3 to 18 carbon atoms and organic peroxides whose half life decomposition temperature after 10 hours is greater than 85° C., and
 (c) from 0 to 40% by weight of customary adhesive additives selected from the group consisting of unsaturated organic acids, unsaturated organic acid amides, unsaturated organic polyesters, thickeners, plasticizers, inorganic fillers, dyestuffs, stabilizers and accelerators.

2. The adhesive composition of claim 1 wherein ingredient (a) is present in an amount of from 75% to 95% by weight and ingredient (b) is present in an amount from 0.5% to 10% by weight.

3. The adhesive composition of claim 1 wherein R' is methyl.

References Cited

UNITED STATES PATENTS

| | | | |
|---|---|---|---|
| 3,373,075 | 3/1968 | Fekete | 260—837 |
| 3,377,406 | 4/1968 | Newey | 260—836 |
| 3,420,914 | 1/1969 | May | 260—837 |
| 3,432,478 | 3/1969 | May | 260—837 |

OTHER REFERENCES

Mageli, O. L. et al., The Use of Organic Peroxides in Curing Reinforced Plastics, 101–117. National Meeting of The American Chemical Society, September 1963.

PAUL LIEBERMAN, Primary Examiner

U.S. Cl. X.R.

161—184, 185, 186; 260—30.6 R, 30.8 R, 31.8 EP, 32.8 EP, 33.2 EP, 33.4 EP, 33.6 EP, 37 EP, 41 A, 41 B, 835, 836, 837 PV